United States Patent [19]

Kiuchi

[11] Patent Number: 4,643,916

[45] Date of Patent: Feb. 17, 1987

[54] METHOD FOR MANUFACTURING A PRESSURE BELT FOR USE WITH EXTENDED NIP PRESS IN PAPER MAKING MACHINE

[75] Inventor: Masao Kiuchi, Kamagaya, Japan

[73] Assignee: Ichikawa Woolen Textile Co., Ltd., Japan

[21] Appl. No.: 772,681

[22] Filed: Sep. 5, 1985

Related U.S. Application Data

[62] Division of Ser. No. 537,575, Sep. 30, 1983, Pat. No. 4,559,258.

[30] Foreign Application Priority Data

Oct. 1, 1982 [JP] Japan .................... 57-147931

[51] Int. Cl.[4] .................... B05D 3/02; B05D 3/12; B05D 5/00
[52] U.S. Cl. .................... 427/176; 156/137; 427/210; 427/278
[58] Field of Search .................... 156/137, 139, 140; 427/210, 278, 176

[56] References Cited

U.S. PATENT DOCUMENTS 4,224,372  9/1980  Romanski .................... 418/257
4,446,187  5/1984  Eklund .................... 428/136

*Primary Examiner*—Evan K. Lawrence
*Attorney, Agent, or Firm*—Lane and Aitken

[57] ABSTRACT

A method for manufacturing a pressure belt for use with an extended nip press in a paper making machine. The belt is characterized by a base fabric formed of a synthetic fiber filament, and formed with a synthetic resin layer on each outer and inner peripheral side thereof. The outer peripheral side which becomes in contact with the felt is provided with a number of drain channels. In the method of manufacturing, a base fabric in the form of an endless belt is trained around a heating cylinder, guide rolls and stretching rolls. The outer peripheral surface of the base fabric is coated with a curable synthetic resin as the fabric is moved. The layer of synthetic resin is semi-cured by heating means including the heating cylinder. This process of coating and semi-curing is repeated until desired thickness of the resin layer is obtained. Drain channels are then formed in the semi-cured resin by an embossed roll whereupon the resin layer is cured and then ground to provide a desired thickness. The inner surface of the belt is then coated with resin in a similar manner to the coating of the exterior surface followed by curing and grinding to provide a uniform thickness to the finished pressure belt. Such a construction is advantageous, for example, in improving the travelling stability of the belt and the dewatering efficiency with a web of paper.

1 Claim, 4 Drawing Figures

4,643,916

METHOD FOR MANUFACTURING A PRESSURE BELT FOR USE WITH EXTENDED NIP PRESS IN PAPER MAKING MACHINE

CROSS REFERENCE TO RELATED APPLICATIONS

This application is a divisional application of application Ser. No. 537,575, filed Sept. 30, 1983, now U.S. Pat. No. 4,559,258.

BACKGROUND OF THE INVENTION (i) Field of the Invention

The present invention relates to method for manufacturing of a pressure belt for use with an extended nip press in a paper making machine.

(ii) Description of the Prior Art

A conventional press section in a paper making machine has been designed so that a web of paper to be dewatered is carried on a felt and is passed through between a pair of upper and lower adjacent press rolls to squeeze water by linear pressure of the press rolls. Recently, an extended nip press has been developed in which a shoe whose upper surface is somewhat depressed is provided in place of the lower press roll. In such an apparatus, an arcuate surface of the shoe comes into surface contact with the press roll so as to embrace the latter, an endless pressure belt driven by movement of the felt is disposed on the underside of the felt with a web of paper carried thereon and travelling therebetween, and the pressure belt is raised by the pressure shoe to press the felt towards the press roll to thereby form a wide nip region and to increase the water-squeezing effect produced by the surface pressure between the press roll and the pressure shoe. As the pressure belt for the surface pressure nip press (so called an "extended nip press") of the type as described, there is a proposal (GB 2106555A) wherein a layer of synthetic resin such as polyurethane, polypropylene or the like is provided on one surface of a base fabric formed of a synthetic fiber filament. In the prior art, one surface in which is formed such synthetic resin layer serves as a pressure shoe contact surface, and the other surface in which is exposed the base fabric serves as a felt contact surface. However, in said extended nip press, pressure is applied under the condition wherein the shoe is stationary, and therefore, the pressure belt travelling while contacting the shoe cannot travel smoothly unless a friction resistance between the shoe and the surface of the synthetic resin layer is small. To minimize the friction therebetween, lubricating oil is fed between the shoe and the surface of the synthetic resin layer. However, since high pressure is applied to the lubricating oil, oil exudes onto the surface through extremely fine air bubbles such as pin holes present in the synthetic resin layer of the pressure belt and sometimes adheres to the web of paper through the felt to produce unacceptable paper. In addition, in the belt in which the synthetic resin layer is formed on only one surface, both width ends of the belt become warped due to a difference in thermal shrinkage between the base fabric and the synthetic resin when the synthetic resin is cured. When such a belt is mounted on an extended nip press in use, tension of the belt has to be increased so as to minimize the warp of both ends of the belt, causing undesirable results in that (i) the friction between the belt and the shoe increases to shorten the belt life, (ii) the belt becomes difficult to be driven by movement of the felt, and the exposed surface of the base fabric becomes worn, resulting in breaking of the belt and shortening of the life thereof, and (iii) water moved from the felt cannot be discharged smoothly to deteriorate water-squeezing properties. Of course, the warp of the belt occurs only in both width ends, and since the width of the web of paper to be dewatered is smaller than that of the belt, the belt can be made to travel without increasing tension thereof. However, warped end portions cause lubricating oil to be scraped insufficiently from the belt by a doctor, and consequently, troubles such as transferring, scattering or adherence of lubricating oil to the felt and paper likely occur. Further, the other surface in which base fabric is exposed also poses disadvantages in that (i) the base fabric becomes worn severely because of the frictional resistance between the belt and the felt, which is required to be great enough to drive the pressure belt smoothly, and (ii) dewatering efficiency deteriorates because of an increasing moisture content of the felt, caused by the small capacity of the belt surface for receiving the water transferred from the felt.

SUMMARY OF THE INVENTION

The present invention has been developed to mitigate the above-mentioned disadvantages by providing a method of manufacture for a pressure belt which is excellent in drainage, wear resistance and travelling stability.

That is, the present invention provides a method of manufacturing pressure belt for an extended nip press in a paper making machine characterized in that both outer and inner peripheral surfaces of what is essentially an endless belt of synthetic fiber filament base fabric are coated with a synthetic resin layer, and a number of drain channels are provided in said outer peripheral surface.

DETAILED DESCRIPTION OF THE INVENTION AND PREFERRED EMBODIMENTS

The present invention will now be described with reference to the accompanying drawings.

Figure 1:
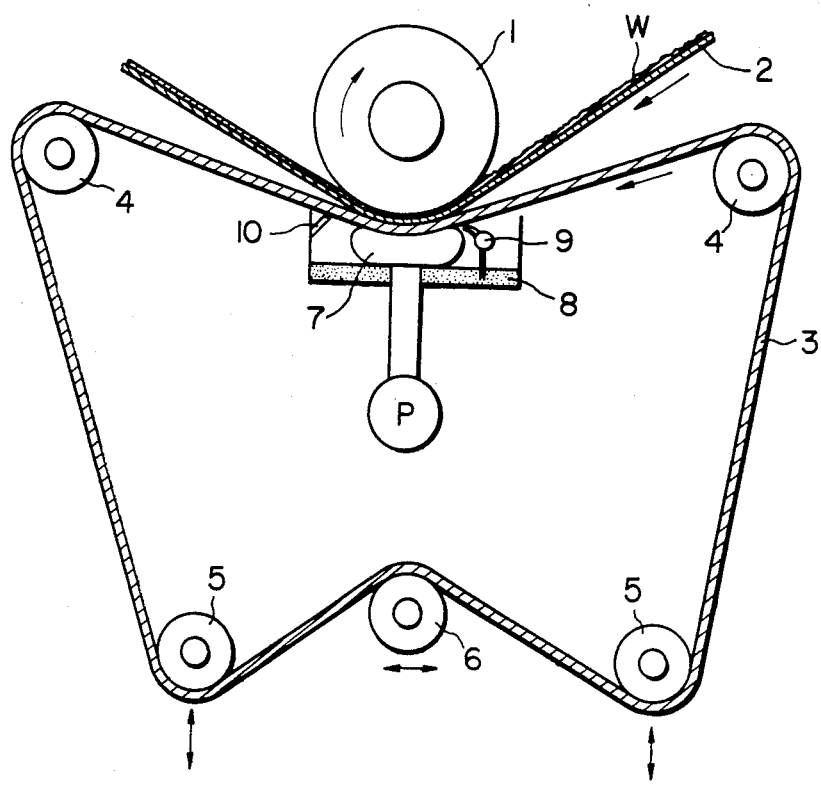
FIG. 1 is a side view of an extended nip press in a paper making machine which uses a pressure belt made in accordance with the present invention.

In FIG. 1, a reference numeral 1 denotes a press roll and a reference numeral 2 denotes a travelling felt which is trained around the press roll 1. In the figure, single sheet is shown but two sheets may also be used. In case of the single felt, dewatering of a web of paper W is carried out between the press roll 1 and the felt 2. In the case where the upper and lower two travelling felts are used, the web of paper W is introduced between the two felts. A reference numeral 3 denotes a pressure belt which is pressed towards the press roll 1 from the outside of the travelling felt 2. The pressure belt 3 travels around guide rolls 4 located frontwardly and rearwardly of the press roll 1, tension rolls 5 for adjusting tension of the belt and a guide roll 6 for preventing the belt from being one-sided. A reference numeral 7 denotes a pressure shoe having an arcuate shape facing the surface of the press roll to press the pressure belt 3 towards the press roll 1 from the outside of the travelling felt 2. It is noted that the pressing force is controlled by a pressure source P.

The pressure belt 3 is driven by the indirect driving system which is followed by the positive drive of the press roll 1.

Lubricating oil 8, a feed device 9 therefor and a doctor 10 for removal thereof are provided in order to minimize the frictional resistance between the pressure belt 3 and the pressure shoe 7.

Figure 2:
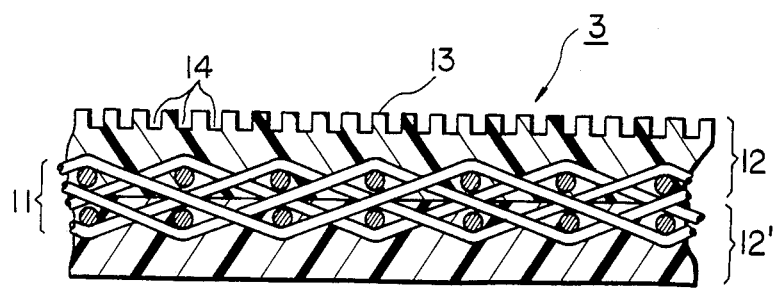
FIG. 2 is an enlarged sectional view of a part of the pressure belt.

The pressure belt 3 made by the process of the present invention is constructed in such a way that as shown in FIG. 2, layers of synthetic resin 12, 12' are formed on both inside and outside surfaces of an endless base fabric 11, and a number of drain channels 14 are then provided over the entire surface of a belt with which felt comes into contact. Since the belt contact surface comprises the synthetic resin layer such as polyurethane and polypropylene, mechanical wear and chemical deterioration resulting from hydrolysis or the like can be prevented to extend the service life of the belt. Furthermore, the provision of a number of drain channels on the felt contact surface gives an another advantage in that the frictional resistance between the belt and the felt increases to render the travelling of the belt smooth and water squeezed from the felt can be rapidly discharge through said drain channels, thus enhancing the dewatering efficiency of web of paper. Moreover, the synthetic resin layers formed on both surfaces of the base fabric enables to provide a pressure belt which is excellent in drainability and travelling stability, has an extended service life and can enhance the dewatering efficiency of web of paper, without producing unacceptable paper resulting from exudation of lubricating oil and warp of both ends widthwise of the belt, as previously described.

The base fabric 11 is formed in such a way that mesh or not-like fabrics formed from monofilament yarns or multifilament yarns or a combination thereof which are synthetic fibers such as of a polyester type, a polyamide type, an aromatic polyamide type, an aramide type, or the like are woven flat, which opposite ends are jointed into an endless form, or woven endless from the beginning. As for the weaving texture, a warp backed weave or warp triple weave is particularly preferable in terms of dimension stability, crease resistance and travelling stability. For the purpose of minimizing the wear of the base fabric in the felt contact surface to extend the service life, prior art belts comprising a synthetic resin layer in only one side of the base fabric are constructed in such a manner that the backed weave is applied to the base fabric to vary the weaving texture of the inside and outside surfaces thereof so that a weft comes into contact with the felt surface more than a warp of the base fabric on the side of the felt contact surface does. However, because of a difference in construction between the two faces of the base fabric, weaving itself is cumbersome and the base fabric tends to warp at the time of weaving and at the time of heat-setting, resulting in a difficulty of plastic coating. On the other hand, the base fabric used for the belt in accordance with the present invention has the same construction in both two faces thereof and has therefore advantages in that handling of the base fabric is easy at the time of weaving and at the time of heat-setting, and coating can be performed relatively easily since the base fabric is free from warp though more time may be required for coating the both sides with synthetic resin.

The synthetic resin layers 12, 12' are formed by applying synthetic resins such as polyurethane resin, chlorosulfonated polyethylene (CSM), epichlorohydrin rubber or the like to both surfaces of the base fabric 11.

The method for manufacturing the pressure belt in accordance with the present invention comprises training the endless base fabric around a heating cylinder, guide rolls and stretching rolls in a suitable manner, supplying liquid synthetic resin to coat the outer peripheral surface of the base fabric while moving the base fabric past a doctor blade to provide a given thickness, and a hot air blowing device to heat the coating and the heating cylinder, and then further heating the material using a heating means such as an infrared heater. The aforesaid coating and heating operation is repeatedly performed for predetermined times, however, to form a semi-cured synthetic resin layer on the outer peripheral portion of the base fabric. When the desired thickness of resin is obtained, the surface of the semi-cured resin layer is then subjected to pressing by an embossed roll having a desired pattern (lattice or crossed pattern) to form drain channels of that pattern in the resin layer, after which, only then, the resin is cured by the infrared heater. Afterwards, the resin layer is ground by a grinding means such as a grinding roll so as to provide a uniform thickness. Next, resin-coating on the inner peripheral surface of the base fabric is accomplished while it is passed over and between the rolls. That is, a doctor blade and coating device, hot air blowing device and an infrared heater are provided on the inner peripheral surface of the base fabric to form a smooth resin layer in a manner similar to that used when the outer peripheral resin layer is formed, and the resin layer on the inner peripheral surface is also ground as the final finishing step to provide a uniform thickness. When a lubricant such as polytetrafluoroethylene, molybdenum sulfide or the like is mixed into the synthetic resin, to form a layer resin on the inner peripheral surface side, lubrication with respect to the pressure shoe is increased by the action of the mixed lubricant to improve the wear resistance. In particular, polytetrafluoroethylene which has a small in coefficient of friction and is excellent in its lubricating properties is preferably mixed into a polyurethane resin which has good elasticity and wear resistance. The mixing percentage of said lubricant is 10–40% in weight ratio relative to said synthetic resin, and preferably, 15–25%. If said percentage is less than 10%, the lubricating effect is poor whereas if it is more than 40%, the elasticity, wear resistance, or the like, of the synthetic resin is impaired. The thickness of the synthetic resin layer to be formed is—depending on the radius of curvature of the press roll 1 and the pressure shoe 7, the thickness of felt, or the like—preferably, 0.3 mm to 3.0 mm for one side, and the hardness of the resin layer is preferably 80° to 90° in JIS hardness. While, in the present invention, a coating system has been shown as the method of forming the synthetic resin layer, a method can also be employed wherein a sheet of synthetic resin is placed on the base fabric and made to pass through a pair of hot rolls to thereby deposit the synthetic resin on the outer and inner peripheral surfaces of the base fabric. As for the method of forming the drain channels, mechanical graving can be used, but the embossed roll system is more readily used for simultaneous resin coating.

Figure 3A:
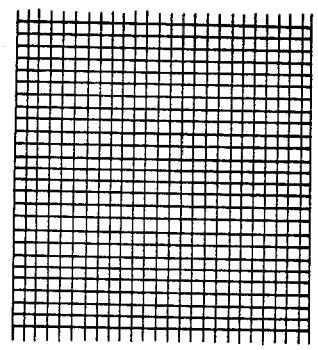
FIGS. 3A and 3B are respectively plan views showing examples of patterns of the drain channels in a felt contact surface of the pressure belt of FIG. 2.
Figure 3B:
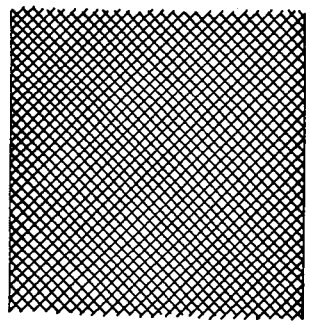

In formation of the drain channels 14, a longitudinal and lateral lattice-like pattern (FIG. 3A) or a obliquely crossed pattern (FIG. 3B) is formed on the whole surface on the side of the felt contact surface 13, and the sectional shape of each channel includes a square, a semi-circle or a V-shape, among which the square pattern is shown in FIG. 2. The depth of channel and the number of channels per area are determined in accordance with the magnitude of frictional resistance relative to the felt and an amount of water moved from the felt.

As described above, the pressure belt in accordance with the present invention is constructed in such a way that a layer of synthetic resin is formed on both surfaces of the base fabric composed of filament yarns of synthetic fiber, and the surface thereof in contact with the pressure shoe has good lubricating properties and wear resistance whereas the surface thereof in contact with the felt is formed with drain channels, as a consequence of which water moved from the felt can be discharged quickly to enhance dewatering efficiency, and the frictional resistance between the belt and the felt is great whereby the belt can be smoothly driven by the felt, and in addition, good wear resistance is obtained. Moreover, since the layer of synthetic resin is formed on both surfaces of the base fabric, the texture of base fabric may be of simple one and will suffice to increase productivity. In addition, since no warp is occurred in the belt after completion of resin coating, excellent travelling stability of belt can be obtained, and such problems of transferring, scattering and exudation of lubricating oil to the paper can be solved.

Examples of the pressure belt in accordance with the present invention will be given herein below.

EXAMPLE 1

A base fabric of a warp backed weave, in which both surfaces are in the same texture with each other and comprising a monofilament and a multifilament, was woven flat and heat-set, after which they were jointed endless using a conventional method. This base fabric was applied to a resin coater and subjected to doctor coating and heating for three times so as to form a polyurethane elastomer layer of 0.7 mm thick on the outer peripheral surface under the condition wherein tension is applied thereto, lengthwise of the base fabric. Then, lattice-like drain channels were formed by the pressing of the embossed roll having a lattice-like pattern while the resin layer was in the semi-set state and then the resin layer was cured by the infrared heater, after which it was ground to provide a uniform thickness. The inner peripheral surface of the endless base fabric was also subjected to doctor coating twice with respect to the resin layer in a manner similar to the coating of the outer peripheral surface and cured, after which it was ground to obtain a uniform belt having an overall thickness of 1.9 mm.

EXAMPLE 2

A base fabric of a weft backed weave, and comprising a monofilament, in which both surfaces are in the same texture with each other, was woven endless and heat-set. The base fabric was applied to the resin coater and the outer peripheral surface thereof was subjected to doctor coating and heating under the condition wherein tension is applied until a polyurethane resin of 100% solids had a thickness of 1.0 mm. At this point, the polyurethane resin was impregnated into the base fabric so that is reached approximately the inside. Drain channels having a crossed-like pattern were formed on the outer surface by the embossed roll while the polyurethane resin layer was in the semi-cured state and the resin was ground after being completely cured, in a manner similar to Example 1. The inner peripheral surface of the endless base fabric was subjected to doctor coating and heating so that the polyurethane resin had a thickness of 0.5 mm. Subsequently, a polyurethane resin with which polytetrafluoroethylene fine grains of weight ratio 20% were mixed, was further subjected to doctor coating to a thickness of 0.5 mm and cured, after which it was ground to obtain a uniform belt having an overall thickness of 3.0 mm.

I claim:

1. A method for manufacturing a pressure belt for an extended nip press in a paper making machine comprising the steps of:

training a base fabric, which is woven flat and joined at opposite ends thereof or woven endless, around a heating cylinder, guide rolls and stretching rolls;

coating an outer peripheral surface of said base fabric with a curable synthetic resin liquid while moving said base fabric, subsequently heating the synthetic resin layer by a heating means into a semi-cured state, said heating means including the heating cylinder, and repeatedly performing the aforesaid operation for the required number of times until a desired thickness of the layer is obtained;

pressing the surface of the semi-cured resin layer by means of an embossed roll to form drain channels having a desired pattern;

curing the layer by further heating;

subsequently grinding the layer so as to have a uniform thickness measured to the outermost surface of the layer to form an outer belt contact surface on the base fabric, while leaving said drain channels in said layer; and repeatedly coating the fabric with the synthetic resin liquid on the inner peripheral surface for a required number of times until the desired thickness of the resin layer is obtained, and then heating, curing and grinding the layer so as to have a uniform thickness.

* * * * *